US010329165B2

(12) United States Patent
Penrose et al.

(10) Patent No.: US 10,329,165 B2
(45) Date of Patent: Jun. 25, 2019

(54) CONDITIONING OF AQUARIUM WATER

(71) Applicant: Aqavive Pty Ltd, Docklands, Victoria (AU)

(72) Inventors: Glen Penrose, Southbank (AU); James Penrose, Southbank (AU); Scott Penrose, Southbank (AU)

(73) Assignee: AQAVIVE PTY LTD, Docklands, Victoria (AU)

( * ) Notice: Subject to any disclaimer, the term of this patent is extended or adjusted under 35 U.S.C. 154(b) by 0 days.

(21) Appl. No.: 15/518,614

(22) PCT Filed: Apr. 21, 2016

(86) PCT No.: PCT/AU2016/000141
§ 371 (c)(1),
(2) Date: Apr. 12, 2017

(87) PCT Pub. No.: WO2016/168888
PCT Pub. Date: Oct. 27, 2016

(65) Prior Publication Data
US 2018/0050927 A1    Feb. 22, 2018

(30) Foreign Application Priority Data
Apr. 21, 2015   (AU) ................ 2015901428

(51) Int. Cl.
*C02F 1/02*     (2006.01)
*A01K 63/04*    (2006.01)
(Continued)

(52) U.S. Cl.
CPC ................ *C02F 1/02* (2013.01); *A01K 63/04* (2013.01); *A01K 63/045* (2013.01);
(Continued)

(58) Field of Classification Search
CPC .......... C02F 1/02; C02F 1/74; C02F 2209/02; C02F 2103/20; C02F 2301/043;
(Continued)

(56) References Cited

U.S. PATENT DOCUMENTS

| | | |
|---|---|---|
| 4,684,462 A | 8/1987 | Augustyniak |
| 4,861,465 A | 8/1989 | Augustyniak |

(Continued)

FOREIGN PATENT DOCUMENTS

DE    3240813    5/1984

OTHER PUBLICATIONS

International Search Report dated Jul. 26, 2016 (3 pages) out of PCT priority Application No. PCT/AU2016/000141.
(Continued)

*Primary Examiner* — Fred Prince
(74) *Attorney, Agent, or Firm* — Brinks Gilson & Lione; John C. Freeman

(57) ABSTRACT

A mobile treatment system having a mobile or wheelable container able to receive a secondary volume of water separate from the primary volume of water of the aquarium; a pump mountable to a portion of the mobile container, a first Inlet of the pump able to draw water from a portion of the mobile container, a first outlet of the pump connectable for selectively directing water drawn into the first Inlet back into the mobile container after conditioning of the water, a second inlet able to draw conditioned water from a portion of the mobile container having the conditioned water; a second outlet allowing transfer of the conditioned water from the mobile container to the aquarium, wherein the water is conditioned in the secondary volume of the mobile container at a position remote to the aquarium.

17 Claims, 17 Drawing Sheets

(51) Int. Cl.
  *A01K 63/06* (2006.01)
  *C02F 1/74* (2006.01)
  *C02F 1/00* (2006.01)
  *C02F 101/12* (2006.01)
  *C02F 103/20* (2006.01)

(52) U.S. Cl.
  CPC .............. *A01K 63/065* (2013.01); *C02F 1/74* (2013.01); *C02F 1/001* (2013.01); *C02F 2101/12* (2013.01); *C02F 2103/20* (2013.01); *C02F 2201/008* (2013.01); *C02F 2209/02* (2013.01); *C02F 2301/043* (2013.01)

(58) Field of Classification Search
  CPC ........... C02F 2201/008; C02F 2101/12; A01K 63/065; A01K 63/045
  USPC ............... 210/167.21, 167.27, 175, 143, 149
  See application file for complete search history.

(56) References Cited

U.S. PATENT DOCUMENTS

| | | |
|---|---|---|
| 5,893,341 A | 4/1999 | Cox |
| 6,140,615 A | 10/2000 | Matsumoto |
| 6,202,677 B1 | 3/2001 | Chen |
| 2009/0159010 A1* | 6/2009 | Spartz .................... A01K 63/00 119/200 |

OTHER PUBLICATIONS

Written Opinion dated Jul. 26, 2016 (7 pages) out of PCT priority Application No. PCT/AU2016/000141.
International Preliminary Report on Patentability dated Mar. 16, 2017 (3 pages) out of PCT priority Application No. PCT/AU2016/000141.

* cited by examiner

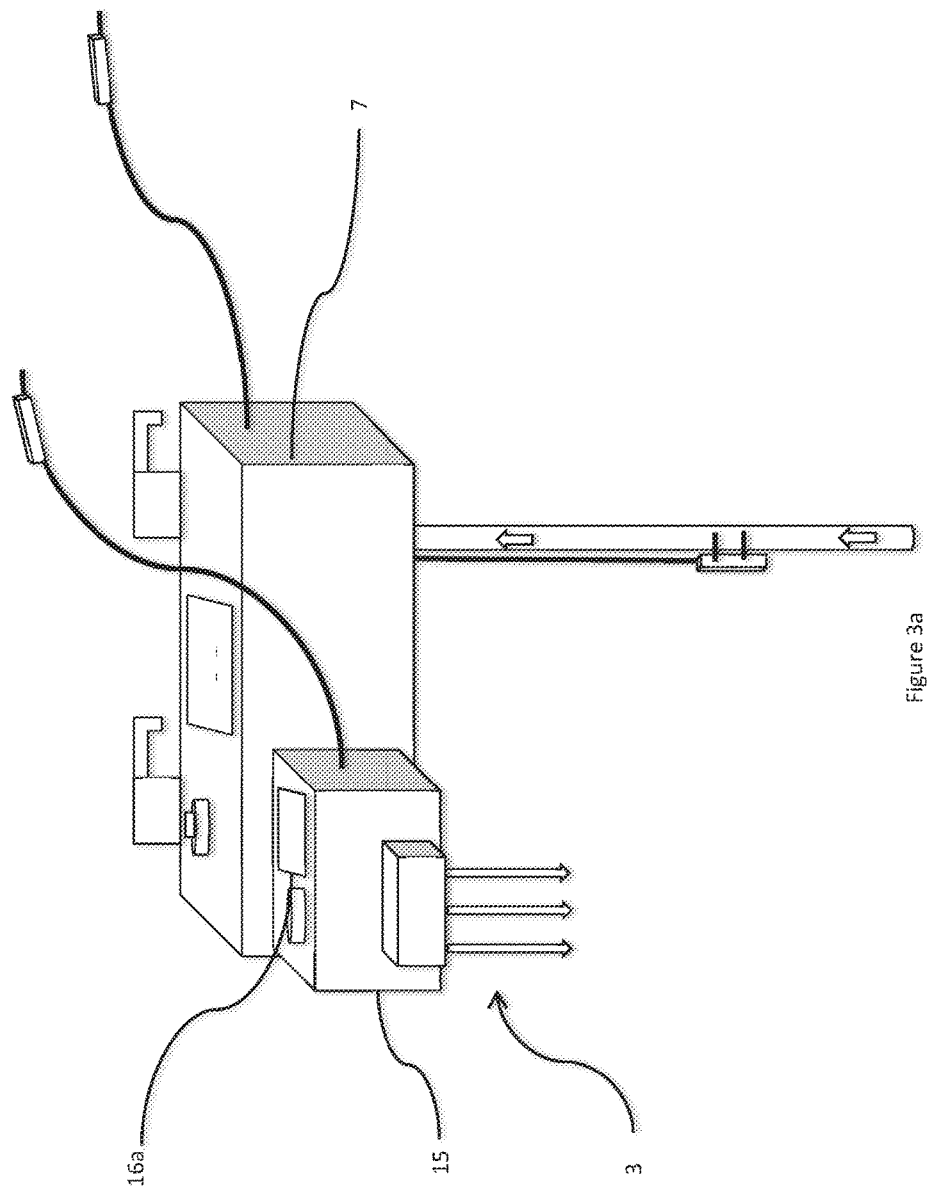

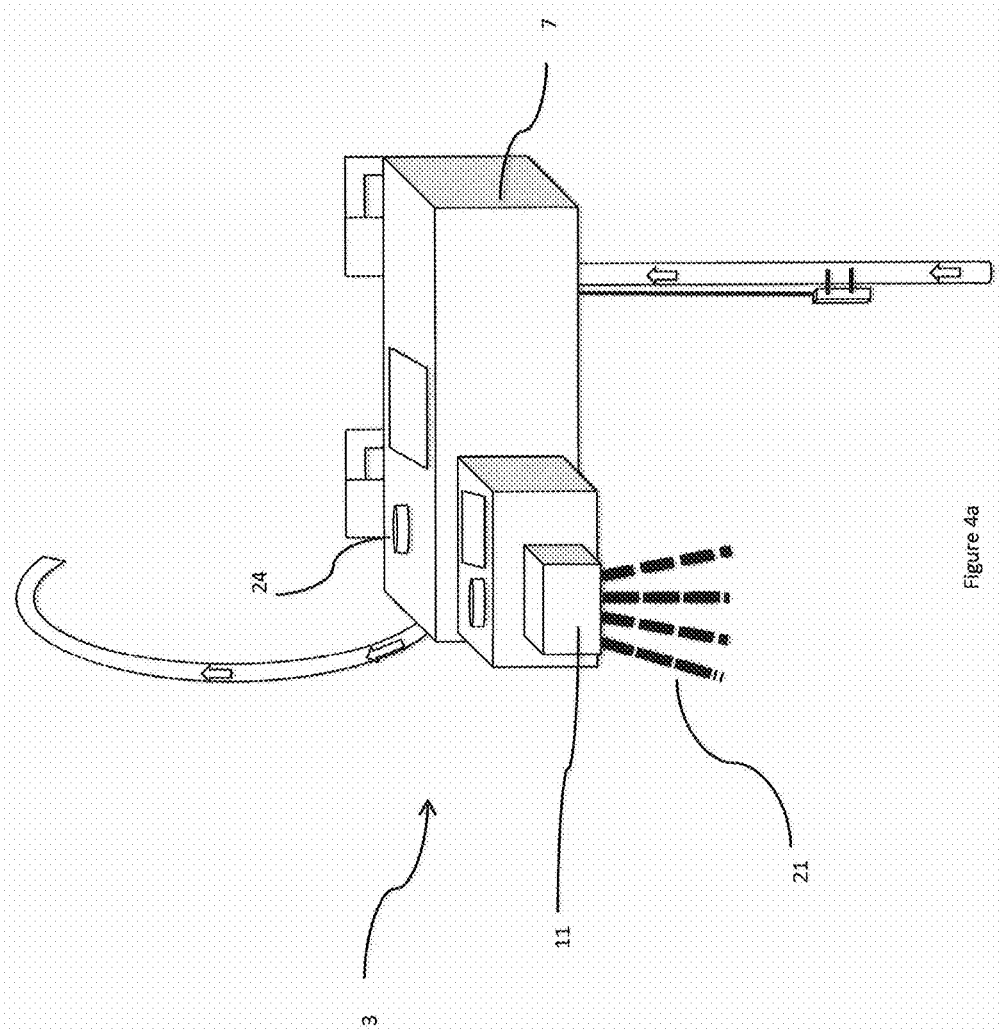

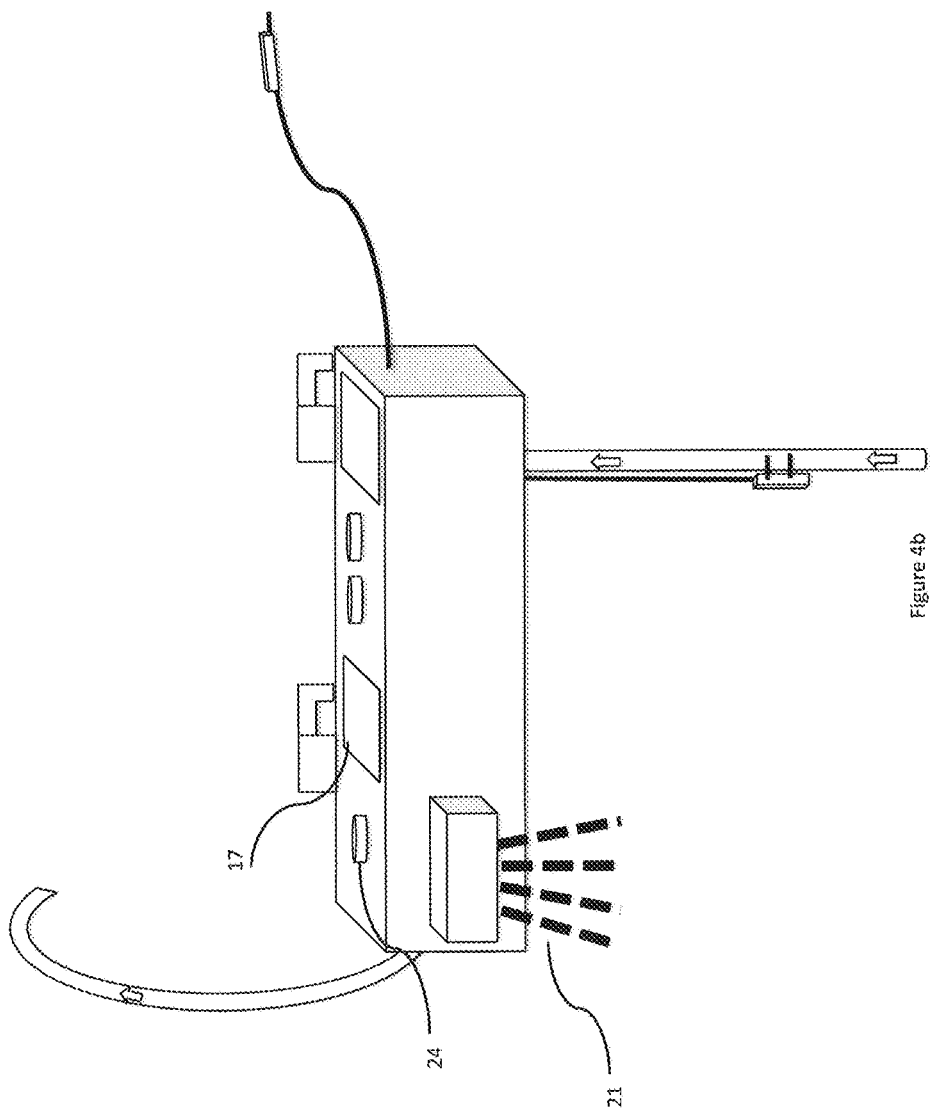

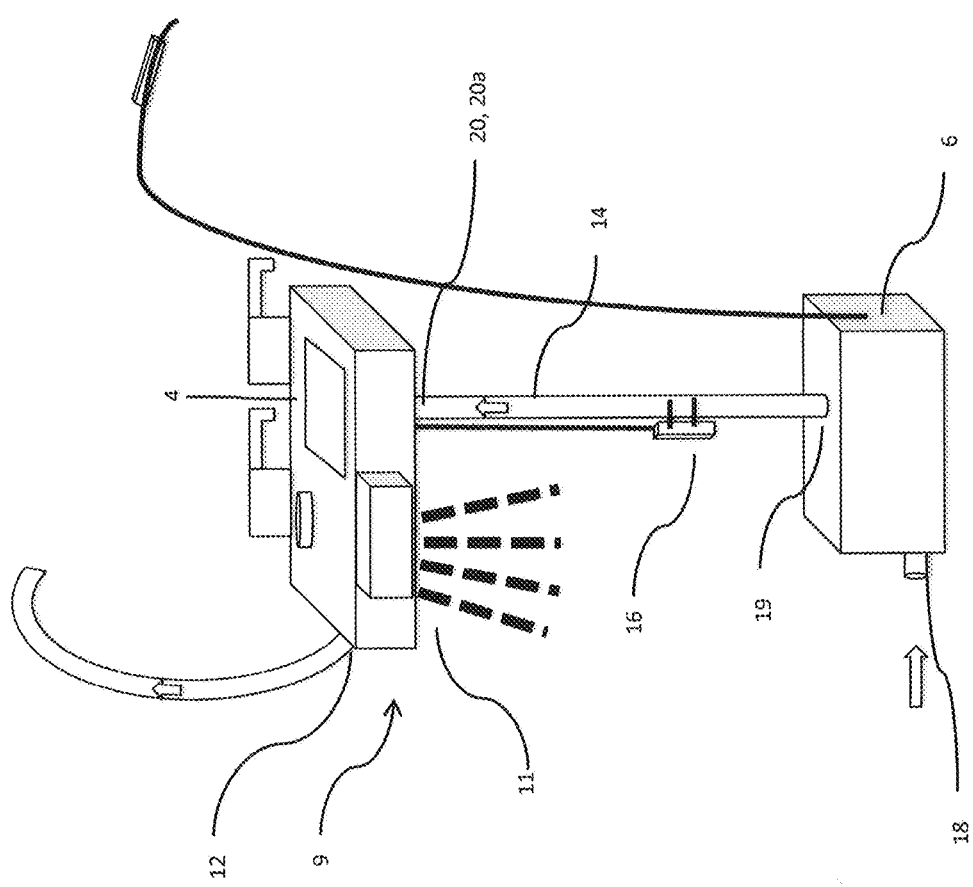

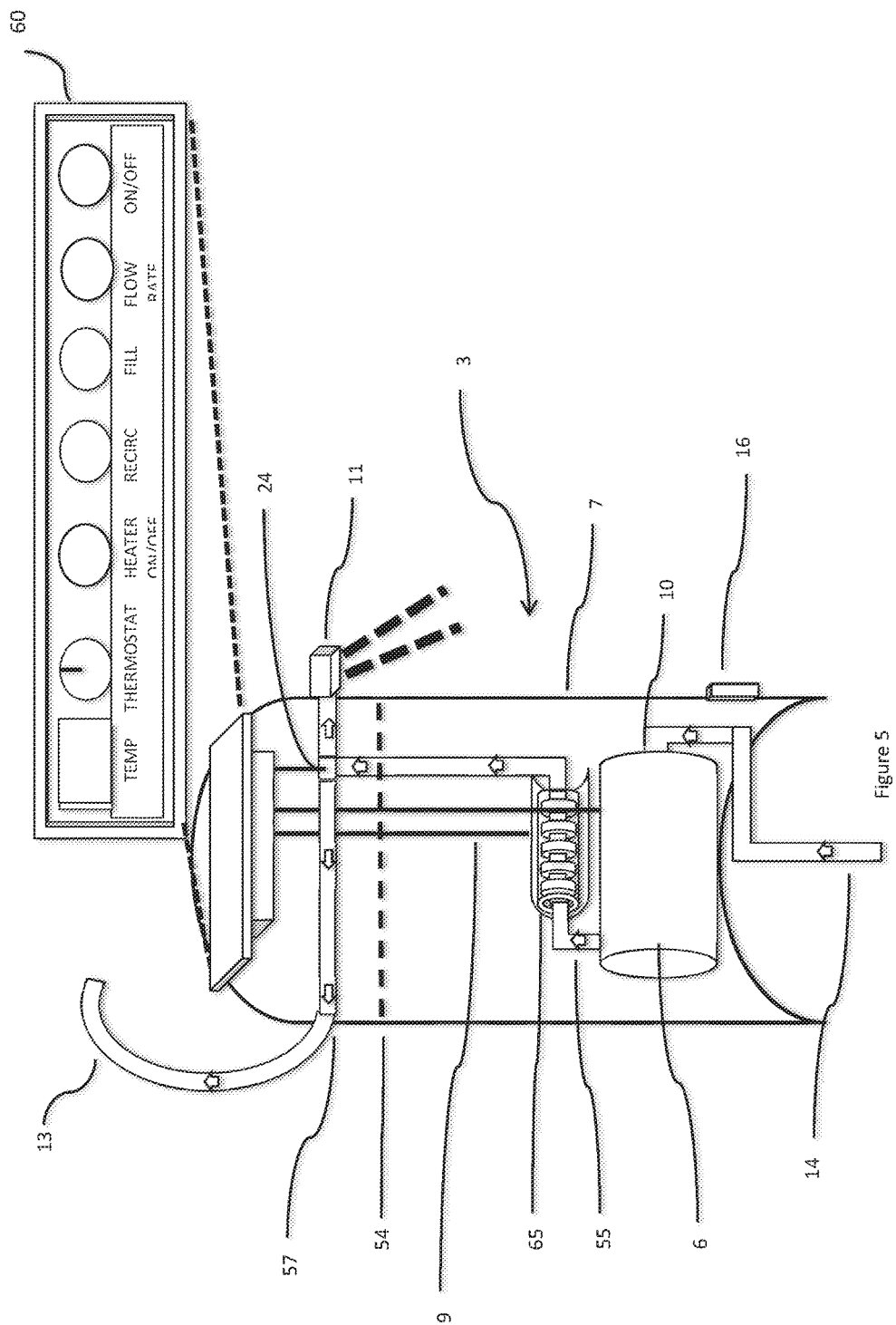

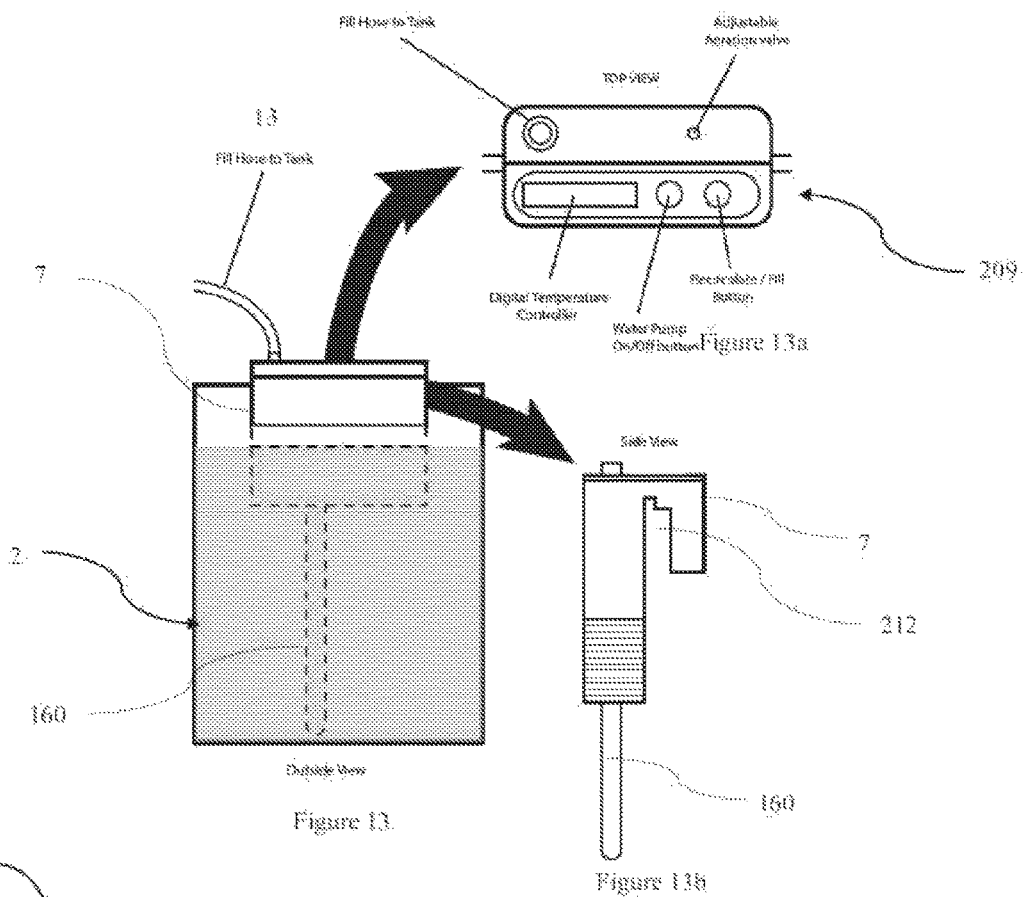
Figure 13.
Figure 13b
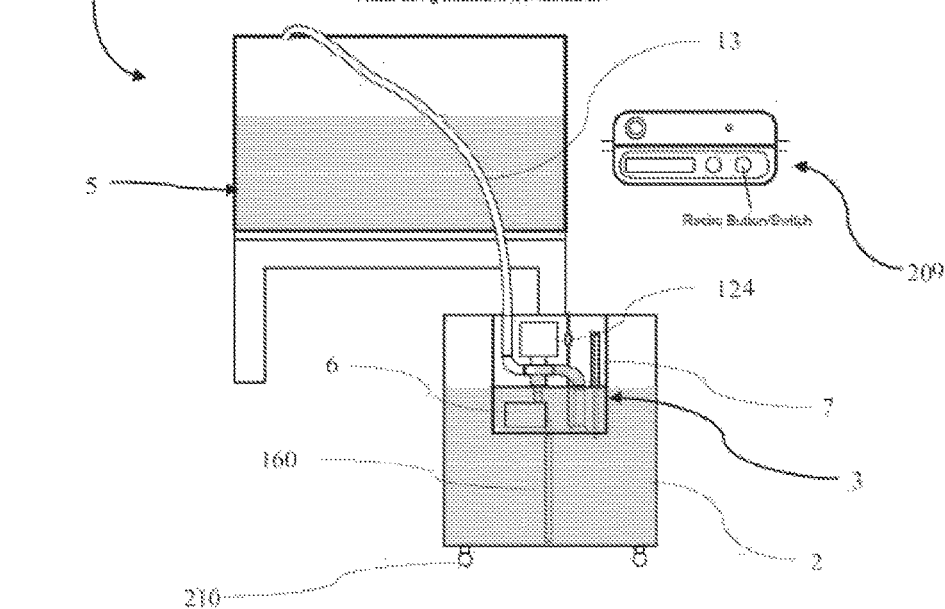
Figure 14

CONDITIONING OF AQUARIUM WATER

This application claims priority to International Application No. PCT/AU2016/000141 filed Apr. 21, 2016 and Australian Application No. 2015901428 filed Apr. 21, 2015; the entire contents of each are incorporated herein by reference.

FIELD OF THE INVENTION

The present invention relates to a system for conditioning of aquarium water. In particular the invention relates to a mobile treatment system or conditioning of aquarium water which can in one form be a mobile system for remote conditioning of water and exchange of and changing water in an aquarium.

The invention has been developed primarily for use with water conditioning and water changing in an aquarium, and will be described hereinafter with reference to this application. However, it will be appreciated that the invention is not limited to this particular field of use.

BACKGROUND OF THE INVENTION

Domestic aquariums of the type used for keeping aquatic animals such as fish, invertebrates, turtles and the like, usually comprise a glass tank and associated equipment including filtration systems for maintaining water quality and conditions for the animals.

One of the main objectives of an aquarium owner is to maintain healthy inhabitants such as fish. Quality of water can affect health and growth of aquarium inhabitants. There is a general misconception by novice aquarium owners that development of efficient filtration systems is sufficient to minimise or even avoid the need for water changes. This is not the case because over time, filtration systems become saturated with particulates which cause decrease in filtration efficiency.

Domestic aquariums are generally closed systems where concentrations of imported chemicals and nutrients can steadily accumulate. Toxins such as ammonia and nitrates can accumulate in the water, and concentration levels can rise to harmful levels if water in the tank is not changed on a regular basis. Therefore to help maintain a desirable balance for aquarium inhabitants, water needs to be changed on a regular basis monthly or even weekly depending on the health of the fish so as to remove potentially harmful toxins, improve water clarity, and replenish healthy water conditions.

Aquarium water changes are usually undertaken in multiple steps including siphoning or gravel vacuuming between 25 to 30% of the total volume, and replenishing the supply of water from a domestic supply by transfer from a hose or bucket. There are a number of drawbacks associated with the conventional cleaning and water replenishment process including the following:

1. fish going into shock with water removal,
2. lack of conditioning of water used to replenish tank volume,
3. addition of water to a tank of a different temperature can stress fish making them prone to 'Ich' (a fish ailment),
4. the conventional method of replenishing water by use of a bucket necessarily means that filling a tank to volume often requires multiple bucket loads of water hence significant time and physical exertion is required to cart multiple buckets for filling; and
5. fish tanks are usually located in dry areas where they can be viewed, and carting numerous loads of bucket water can create water spillage in the dry areas thus leaving an unsightly mess to clean.

It would be advantageous to provide a means for addressing at least one or more of the drawbacks.

One approach in the prior art has included a fluid handling system comprising a fluid handling device in communication with a liquid reservoir the device having an inlet and a first flow passageway for receiving and directing a first flow through under pressure, an outlet port directing flow to an aquarium, a tap off line diverting some of the first flow through a throat, and a second fluid flow passageway extending between the throat and an outlet interconnecting the second passageway with the aquarium, flow of water through the throat causing a reduction in pressure for drawing water from a top portion of the aquarium through the second passageway to a drain via the throat. While such a system works, the elements of the system are connected permanently, take up a large amount of space, detract from the appearance of the aquarium, and involves a complex and expensive assembly.

The present invention seeks to provide system, which will overcome or substantially ameliorate at least one or more of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect of the present invention, there is disclosed a mobile treatment system for conditioning of aquarium water, the system comprising:

a mobile or wheelable container able to receive a secondary volume of water separate from the primary volume of water of the aquarium;

a water treating apparatus having:
  a pump mountable to a portion of the mobile container,
  a first inlet of the pump able to draw water from a portion of the mobile container,
  a first outlet of the pump connectable for selectively directing water drawn into the first inlet back into the mobile container after conditioning of the water,
  a second inlet able to draw conditioned water from a portion of the mobile container having the conditioned water;
  a second outlet allowing transfer of the conditioned water from the mobile container to the aquarium,
wherein the water can be conditioned in the secondary volume of the mobile container at a position remote to the aquarium and be transportable after conditioning to be adjacent the aquarium and allow transfer of the conditioned water through the second outlet to the aquarium.

The system of the present invention provides an alternative cost effective way of conditioning water for an aquarium remote from an aquarium, and subsequent transfer of conditioned water from the container at the site of an aquarium. The system significantly reduces labor and time for replenishing water in an aquarium, and does not form part of the aquarium display hence does not detract from the aesthetic appeal and reduces the likelihood of water spillage in dry areas.

In one aspect the secondary volume of water can be remote from the primary volume of water of the aquarium.

Preferably the water treating apparatus is mountable to a top or rim portion of the mobile container. Alternatively, the water treating apparatus can be mounted so that the pump is submerged in the volume of water in the secondary container.

Preferably the first inlet of the pump is adapted to draw water from a lower portion of the mobile container.

Preferably the first outlet of the pump is connectable for recirculating water drawn into the first inlet back into the mobile container after conditioning of the water.

In one embodiment, the water testing apparatus can include a hose connectable to respective one or more of the first or second inlet and the first or second.

In a further embodiment, a one or more of the first or second inlet can form another of the first or second.

A yet a further embodiment, one or more of the first or second outlet can form another of the first or second outlet. Preferably a one or more of the first or second inlet can form another of the first or second outlet. Preferably the first inlet can form the second inlet.

The mobile treatment system can further include a switching means for redirecting water in the treating apparatus between any one of the inlets and any one of the outlets.

The water treating apparatus can further include a heating device mounted on the pump intermediate the first inlet and first outlet, wherein the heating device can include a means for adjusting the temperature of water exiting the first outlet.

The pump can include mounting brackets adapted for mounting the pump to an upper portion of the mobile or wheelable container. The brackets can be adjustable to allow removable mounting to a rim portion of the mobile container.

Preferably the first outlet of the pump is a spray nozzle arrangement for spraying recirculated water over the surface of water on the mobile container. This form of spraying helps to aerate recirculated water and can dechlorinate the water over time.

Preferably the mobile or wheelable container can include at least one compartment for receiving conditioned water.

The mobile treatment system can further include:
a temperature sensor adjacent the first inlet,
a digital temperature display mounted to the pump for displaying temperature of water at the first inlet, wherein the display is electrically connected to the temperature sensor; and
a heating device mounted on the pump intermediate the first inlet and first outlet, and being operably interconnected to the sensor, wherein the heating device can be programmed to heat recirculated water when a predetermined temperature is higher than the sensed temperature.

An advantage of this system is that recirculated water can be temperature conditioned to match an aquatic species requirement so as to substantially avoid the fish ailment 'Ich'.

The heating device can comprise thermostatically controlled heating element, which the recirculated water can travel through. In one embodiment of the invention the heating device is designed to only operate when the recirculation process is taking place.

In a related aspect of the present invention the water treating apparatus can include:
a pump mountable on a floor portion of a mobile container the container being able to receive a secondary volume of water remote from an aquarium,
a water conditioning and/or flow through system mountable on an upper portion of the container, and interconnected to the pump,
a first inlet of the pump able to draw water from a lower portion of the mobile container,
a first outlet of the pump connected to a first inlet of the water conditioning and/or flow through system,
a first outlet of the water conditioning and/or flow through system connected for recirculating water drawn into the first inlet of the water conditioning and/or flow through system back into the mobile container after conditioning of the water,
a second inlet of the water conditioning and/or flow through system able to receive conditioned water from the first outlet of the pump,
a second outlet of the water conditioning and/or flow through system allowing transfer of the conditioned water from the mobile container to the aquarium,
wherein the water can be conditioned in the secondary volume of the mobile container at a position remote to the aquarium and be transported after conditioning to be adjacent the aquarium and allow transfer of the conditioned water through the second outlet of the water conditioning and/or flow through system to the aquarium.

In a further related aspect of the present invention there is disclosed a method of conditioning of aquarium water comprising:
providing a mobile container able to receive a secondary volume of water remote from the primary volume of water of the aquarium;
providing a water treating apparatus having:
a pump, and
a water conditioning and/or flow through system interconnected to the pump, at least the water conditioning and/or flow through system being mountable to a top portion of the mobile container,
a first inlet of the pump able to draw water from a lower portion of the mobile container,
a first outlet of the water conditioning and/or flow through system connected for recirculating water drawn into the first inlet of the pump back into the mobile container after conditioning of the water,
a second inlet of the pump able to draw conditioned water from a portion of the mobile container having the conditioned water;
a second outlet of the water conditioning and/or flow through system allowing transfer of the conditioned water from the mobile container to the aquarium,
wherein the water conditioning and/or flow through system includes a switching means for selectively controlling operation of flow of water, and
wherein the method including the steps of:
conditioning the water in the secondary volume of the mobile container at a position remote to the aquarium,
transporting the mobile container after conditioning to a position adjacent the aquarium,
operating the switching means to direct and allow transfer of the conditioned water through the second outlet of the water conditioning and/or flow through system to the aquarium.

The method of the present invention can further include matching temperature of recirculated water to a predetermined temperature of the aquarium by heating the water flowing through the first outlet of the water conditioning and/or flow through system back into the container, and determining temperature of conditioned water before transfer to the aquarium.

In a further related aspect of the present invention there is described a mobile treatment system for conditioning of aquarium water comprising:
- a mobile or wheelable container able to receive a secondary volume of water remote from the primary volume of water of the aquarium;
- a water treating apparatus including:
  - a water conditioning and/or flow through system mountable on an upper portion of the container,
  - a pump mountable on a floor portion of the mobile container the pump being interconnected to the water conditioning and/or flow through system,
  - a first inlet of the pump able to draw water from a lower portion of the mobile container,
  - a first outlet of the pump interconnected to a first inlet of the water conditioning and/or flow through system,
  - a first outlet of the water conditioning and/or flow through system connected for recirculating water drawn into the first inlet of the water conditioning and/or flow through system back into the mobile container after conditioning of the water,
  - a second inlet of the water conditioning and/or flow through system able to receive conditioned water from the first outlet of the pump,
  - a second outlet of the water conditioning and/or flow through system allowing transfer of the conditioned water from the mobile container to the aquarium,
- a switching means for the water conditioning and/or flow through system, and wherein the switching means selectively controls passage of water between the water conditioning and/or flow through system and pump, and first and second inlets of the water conditioning and/or flow through system, mobile or wheelable container, and aquarium.

The present system allows for ready changing of water in an aquarium, and because the system is mobile, it also allows filling of different sized containers in a wet area for conditioning, and ready transfer of water to the aquarium substantially minimising spillage and mess in dry areas.

In one embodiment the pump can be integral with the water conditioning and/or flow through system.

It is envisaged that the water treating apparatus can include (a) adjustable mounting brackets to enable ready mounting to a rim portion of the mobile container, (b) a first inlet that draws water from a lower end portion of the container, (c) a first outlet connected to the first inlet, the first outlet being a spray nozzle for recirculating water drawn by the first hose back into the container for removing chlorine from the water, (d) a second inlet connectable to a second outlet, wherein the second inlet can also be the first inlet, for transfer of conditioned water to the aquarium, and (e) a switching means for selectively controlling a mode of operation such as directing water in a desired pathway between the first and second inlets and first and second outlets.

In a second aspect, the problems identified are addressed by providing a mobile water transfer system for replenishing and conditioning an aquarium, the system comprising:
- a mobile or wheelable container for receiving a volume of water remote from an aquarium;
- a pump having adjustable mounting brackets, wherein the brackets are adapted for removably mounting the pump to a rim portion of the mobile container, wherein the pump includes:
  - a first hose that draws water from a lower end portion of the container,
  - an outlet nozzle for recirculating water drawn by the first hose back into the container for removing chlorine from the water,
  - a second hose interconnected to the outlet nozzle, and
  - a switch for redirecting water from the outlet nozzle to the aquarium when conditioning of water in the container is determined
- wherein the container is sized to provide a volume of water for replenishing an aquarium,
- wherein water is added to the container and conditioned by the pump; and
- wherein once conditioning is achieved, the mobile container can be readily transferred close to the aquarium effective for transferring water by the pump from the container to the aquarium.

The present invention provides a mobile treatment system for conditioning of aquarium water including a container on wheels, the container having a water supply, a pump located on a lower portion of the container interconnected to a water conditioning and/or flow through system. The water conditioning and/or flow through system recirculates and conditions water from the container in a first pathway, and when a predetermined condition is obtained, the container is relocated close to an aquarium where a selection device on the water conditioning and/or flow through system directs conditioned water to a transfer line into the aquarium.

Benefits of the system include substantial labor and time savings in changing water of an aquarium, and because the system is mobile, it allows filling of different sized containers in a wet area for conditioning, and ready transfer to the aquarium substantially minimising spillage and mess in dry areas.

In a further related aspect of the present invention there is described a mobile treatment system for conditioning of water in an aquarium comprising:
- a mobile or wheelable container able to receive a secondary volume of water remote from the primary volume of water of the aquarium;
- a water treating apparatus including:
  - a water conditioning and/or flow through system mountable on an upper portion of the container,
  - a pump mountable on a floor portion of the mobile container the pump being interconnected to the water conditioning and/or flow through system,
  - a first inlet of the pump able to draw water from a lower portion of the mobile container,
  - a first outlet of the pump interconnected to a first inlet of the water conditioning and/or flow through system,
  - a first outlet of the water conditioning and/or flow through system connected for recirculating water drawn into the first inlet of the water conditioning and/or flow through system back into the mobile container after conditioning of the water,
  - a second inlet of the water conditioning and/or flow through system able to receive conditioned water from the first outlet of the pump,
  - a second outlet of the water conditioning and/or flow through system allowing transfer of the conditioned water from the mobile container to the aquarium,
  - a third inlet of the water conditioning and/or flow through system allowing transfer of water from the aquarium to the mobile container via the first outlet of the water conditioning and/or flow through system or a third outlet of the water conditioning and/or flow through system, a switching means for the water conditioning and/or flow through system, and wherein the switching means selectively controls passage of water between the water conditioning and/or flow through system and pump, and first, second and third inlets of the water conditioning and/or flow through system, mobile or wheelable container, and aquarium.

In a further embodiment of the present invention it is envisaged that the water treating apparatus can include (a) adjustable mounting brackets to enable ready mounting to a rim portion of the mobile container, (b) a first inlet that draws water from a lower end portion of the container, (c) a first outlet connected to the first inlet, the first outlet being a spray nozzle for recirculating water drawn by the first hose back into the container for removing chlorine from the water, (d) a second inlet connectable to a second outlet, wherein the second inlet can also be the first inlet, for transfer of conditioned water to the aquarium, (e) a third inlet, wherein the third inlet can also be the second outlet, the third inlet being connectable to a third outlet, wherein the third outlet can also be the first and second inlets, whereby water can be transferred from the aquarium to the container for conditioning, and (f) a switching means for selectively controlling a mode of operation such as directing water in a desired pathway between the first, second and third inlets and first, second and third outlets.

A further alternative embodiment the water treatment apparatus can include a housing adapted for mounting on a rim portion of the secondary container. The housing can accommodate a water pump having an adjustable intake pipe forming a first inlet for receiving liquid from the secondary container, and a first outlet. The water treatment apparatus can further comprise a water conditioning and/or flow through system having a network of liquid transfer conduits and valve means forming multiple water flow pathways within the housing.

In the preferred embodiment, the first outlet of the water treatment apparatus can be interconnected by a conduit to a recirculation nozzle which is submerged in the water of the secondary container. This forms a first flow pathway having a second inlet and a second outlet. A further conduit forms a second flow pathway defining a third outlet for directing conditioned water to a separate aquarium downstream.

The recirculation nozzle acts as a liquid flow accelerator, and can be interconnected to an adjustable one way air valve. This allows flow of air from the environment to assist aeration of accelerated water flow at the recirculation nozzle. The aeration at the nozzle assists to remove chlorine from the water. In one embodiment, additional conditioning chemicals can be added to the secondary container.

The water treatment apparatus can further contain an electronic ball valve mounted in the housing, which is operable to open and close the at least first and second flow pathways, and a heater having an adjustable heater slide. The slide heater in this embodiment can be mounted within the housing and adapted to be in contact with the water in the secondary container. Heating of the water in the secondary container provides an improved temperature matching for the conditioned water and aquarium.

As a general definition, the term 'water' used herein can include liquids, fluids containing various nutrients and additives for use in an aquarium.

Other aspects of the invention are also disclosed.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which:

FIGS. 3*a* and 3*b* are a schematic representation of FIG. 2 with heating device in accordance with another preferred embodiment of the present invention;

FIGS. 4*a* to 4*c* are each a schematic representations of various embodiments of the water treating apparatus in accordance with another preferred embodiments of the present invention;

FIG. 5 is a schematic cut away representation of water treating apparatus used in the mobile water transfer system in accordance with another preferred embodiment of the present invention;

FIG. 13 is a schematic representation in end view of secondary container and water treatment apparatus;

FIG. 13*a* is a schematic representation in a plan view of controller for operating the water treatment apparatus;

FIG. 13*b* is a schematic representation in side view of the water treatment apparatus in FIG. 13;

FIG. 14 is a schematic representation of a mobile treatment system including a water treating apparatus of FIG. 11 or 12;

DETAILED DESCRIPTION WITH REFERENCE TO ACCOMPANYING DRAWINGS

Figure 17:
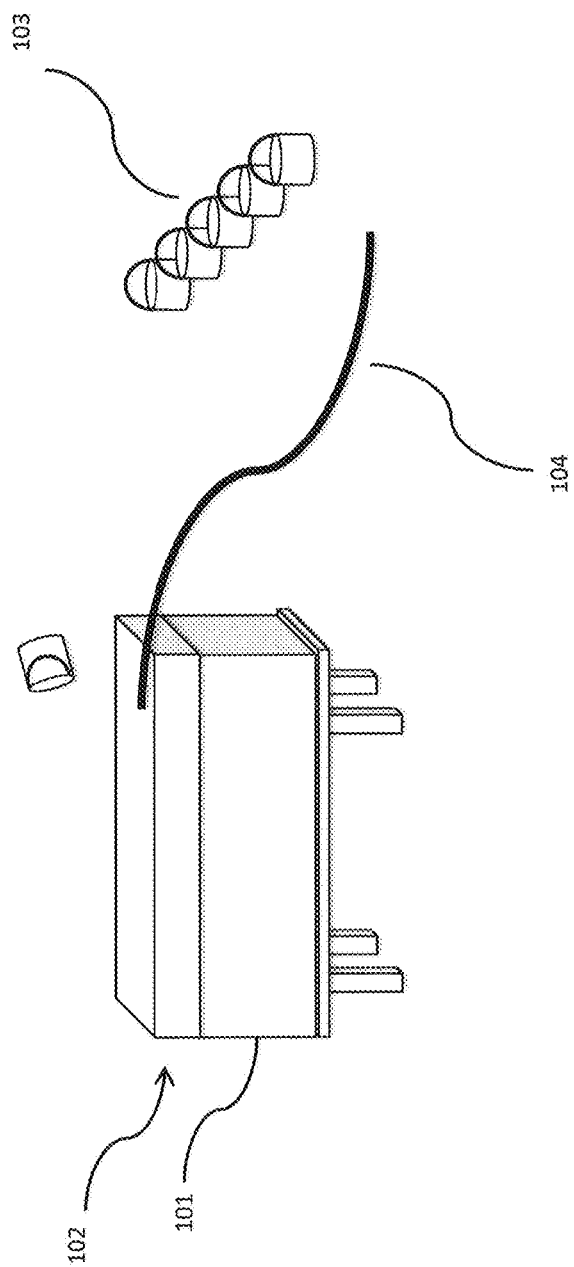
FIG. 17 is a schematic representation of a prior art method of replenishing water of an aquarium.

In the prior art (see FIG. 17), in order to replenish water 101 in an aquarium 102 it is usual to remove water by the bucket load or siphoned with a gravel cleaner into a bucket, and replace removed water with a similar volume of water with multiple buckets (103) or hose (104). As indicated, prior art water replacement for an aquarium is very time consuming and labor intensive, not to mention the likelihood of spillage upon removal and replacement, and potential for adverse effects on fish and other aquatic life in an aquarium.

Figure 1:
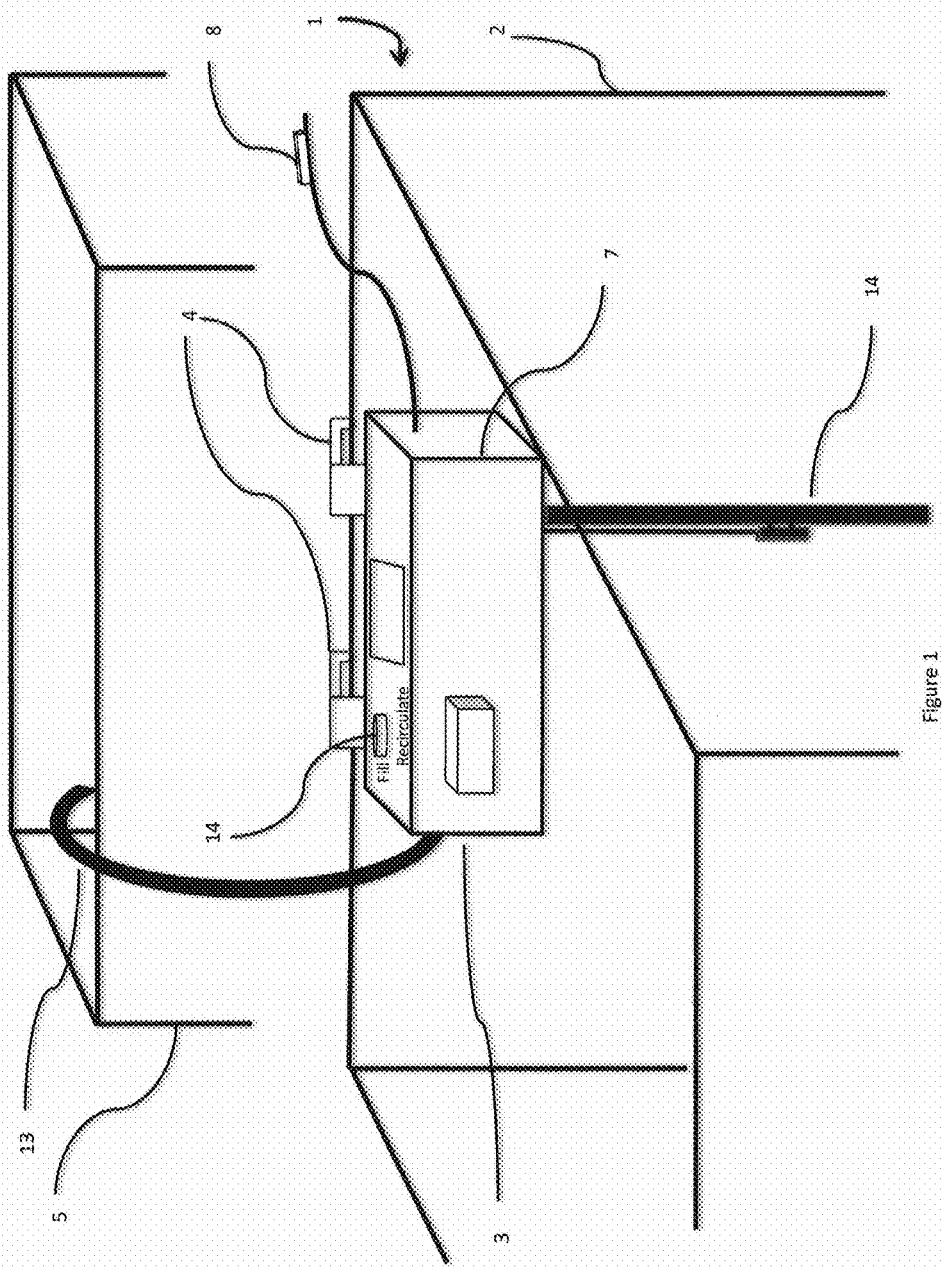
FIG. 1 is a schematic representation of a mobile water transfer system in accordance with a preferred embodiment of the present invention showing transfer of conditioned water to an aquarium.

In order to overcome the issues associated with prior art methods of replenishing aquarium water, FIG. 1 generally shows a mobile treatment system 1 for conditioning of water in an aquarium comprising a secondary container being a mobile or wheelable container 2, and a water treating apparatus 3 mounted on a portion of the container by brackets 4.

The mobile or wheelable container 2 is sized to receive a volume of water remote from the aquarium 5. In this embodiment the water treating apparatus 3 includes a water conditioning and/or flow through system 9 and a pump 6 (shown in cut out section of FIG. 3b and FIG. 4c) mounted within a housing 7. The flow through system 9 and pump 6 are powered electrically and have a power connection cord 8 for connection to domestic supply.

In one embodiment (best seen in FIGS. 6 and 7) the mobile or wheelable container 2 of the mobile treatment system 1 receives a secondary volume of water 52 remote from a primary volume of water in the aquarium 5, and the water conditioned including temperature matching, nutrient addition, oxygenation for a time. When a desired conditioning is obtained, the mobile container is moved sufficiently close to the aquarium 5, and conditioned water transferred from the container to the aquarium by operation of the water treating apparatus 3. Further, it is understood that the process facilitates the use of chemical additives. While undertaking the treatment of the water to be introduced to the Aquarium reduces the amount of chemical additives required, the system is further adapted to allow addition of chemical additives into the secondary container, which are thoroughly mixed through the recirculation process.

Figure 2:
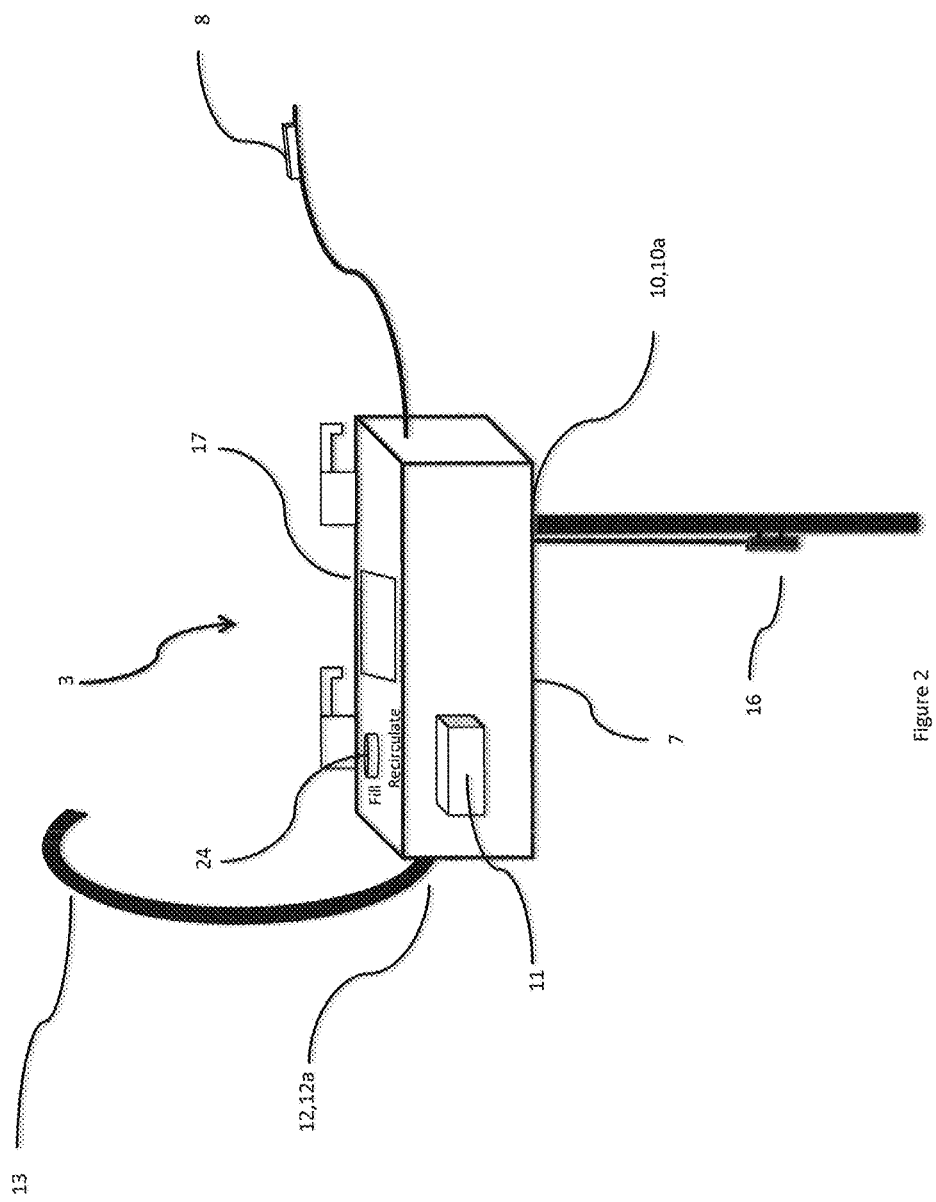
FIG. 2 is a schematic representation of water treating apparatus used in the mobile water transfer system in accordance with another preferred embodiment of the present invention.
Figure 3B:
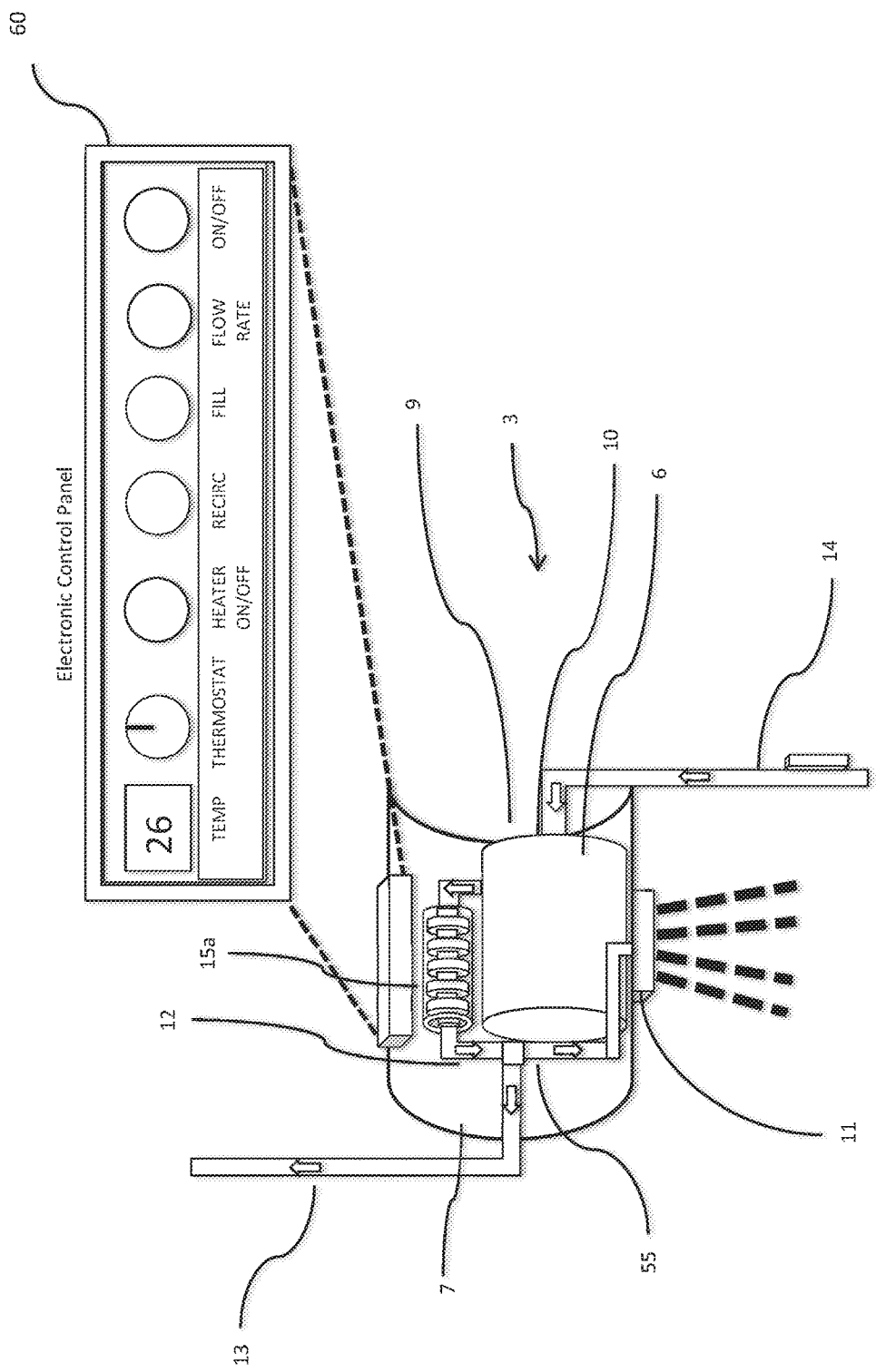

Referring to FIGS. 2 and 3a and 3b, the water treating apparatus 3 includes a pump 6 and a water conditioning and/or flow through system 9 (part shown in FIGS. 3b and 7) within a housing 7. The water treating apparatus 3 includes a first inlet 10 of the pump, which in a first operating condition draws water from a lower portion of the mobile container 2 through conduit 14 (the arrows showing direction of flow). A first outlet 55 of the pump 6 (best shown in FIG. 5) is connected to a spray nozzle outlet 11 defining a first passage for recirculating water drawn into the first inlet 10 back into the mobile container 2 after conditioning of the water. This select passage of spray recirculating of water in the secondary container helps to de-chlorinate and oxygenate the water Each of the embodiments shown in FIGS. 2 to 4c also show a second outlet 12 of the water conditioning and/or flow through system. In a second of a number of select operational modes, the water treating apparatus 3 includes a second inlet of the pump 10a, which defines a second passage in the water conditioning and/or flow through system to allow transfer of conditioned water from the container to the aquarium via second outlet 12 and conduit/hose 13.

In another operational mode (not shown), the water treating apparatus 3 includes a third inlet in the water conditioning and/or flow through system for receiving water from the aquarium. Water entering the third inlet can be directed by control means through a third passageway exiting a third outlet in the water conditioning and/or flow through system, or even a fourth passage between the third inlet and a fourth outlet of the pump.

Control of water flow through the inlets and outlets is managed by a switching means 24 (see FIG. 2). This can include a valve arrangement which closes a select passage so that water flow can be directed for controlling an operation to (a) recirculate and condition water, and (b) replenish water volume in the aquarium. In FIG. 3b and FIGS. 5 to 7, the system includes an electronic control panel 60 adapted for mounting on a platform of the housing 7.

As shown in FIGS. 3a, 4a and 4b the water treating apparatus 3 further includes a water heating device 15 immediately upstream of the outlet spray nozzle 11. The heating device in one embodiment comprises a heating element 15a. The heating device in FIG. 3a is mounted on the housing 7 intermediate the first inlet 10 and first outlet 55. As shown, the heating device further includes a means for adjusting the temperature of water exiting the spray nozzle outlet 11 comprising a temperature sensor 16 interconnected to a temperature selection device 17 and a second temperature sensor 16a at the nozzle outlet 11. Alternatively, as shown in FIG. 3b and FIGS. 5 to 7, the electronic control panel 60 controls heating by on/off switch and thermostat setting. The electronic control panel further includes a temperature display which receives sensed information from the sensor 16, and a fluid passage control means for selecting passage of fluid for recirculation, or filling the aquarium.

As water from the container is drawn into pump inlet 10 through conduit 14, the water temperature is sensed by sensor 16. If the sensed temperature is lower than the temperature selection, the heating element is activated and water 21 passing through first outlet 11 is heated and recirculated until temperature sensor 16 measures temperature at the selected temperature. If hot water is added to the water in the secondary container, then the water needs to be tested and treated accordingly. The addition of hot water is especially practical for the quick water changes.

Referring to FIG. 4c there is shown a further embodiment in which the pump 6 is submersible and located in the water remote from the water conditioning and/or flow through system 9. In this embodiment the pump 6 is located on a floor portion of the container 2 and has a first inlet 18 and a first outlet 19, the first outlet 19 being interconnected by conduit 14 to a first inlet 20 of the water conditioning and/or flow through system 9.

The water conditioning and/or flow through system 9 includes a first outlet 11 forming a first passage for recirculating water drawn into the first inlet 20 back into the mobile container after conditioning of the water. The water conditioning and/or flow through system 9 further includes a second inlet 20a and a second outlet 12 forming a second passage for transferring conditioned water to the aquarium.

Figure 6:
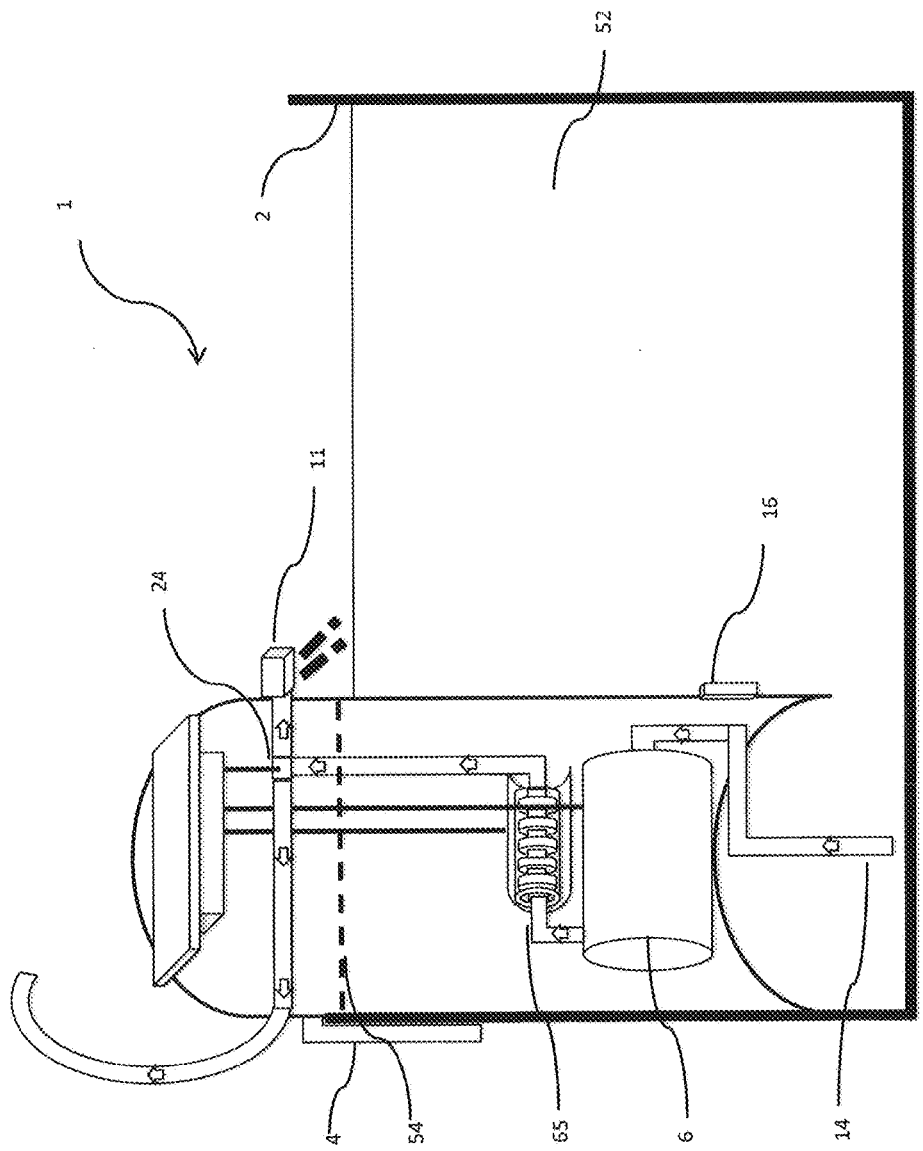
FIGS. 6 and 7 are schematic cut away representations of a mobile water transfer system in accordance with another preferred embodiment of the present invention.
Figure 7:
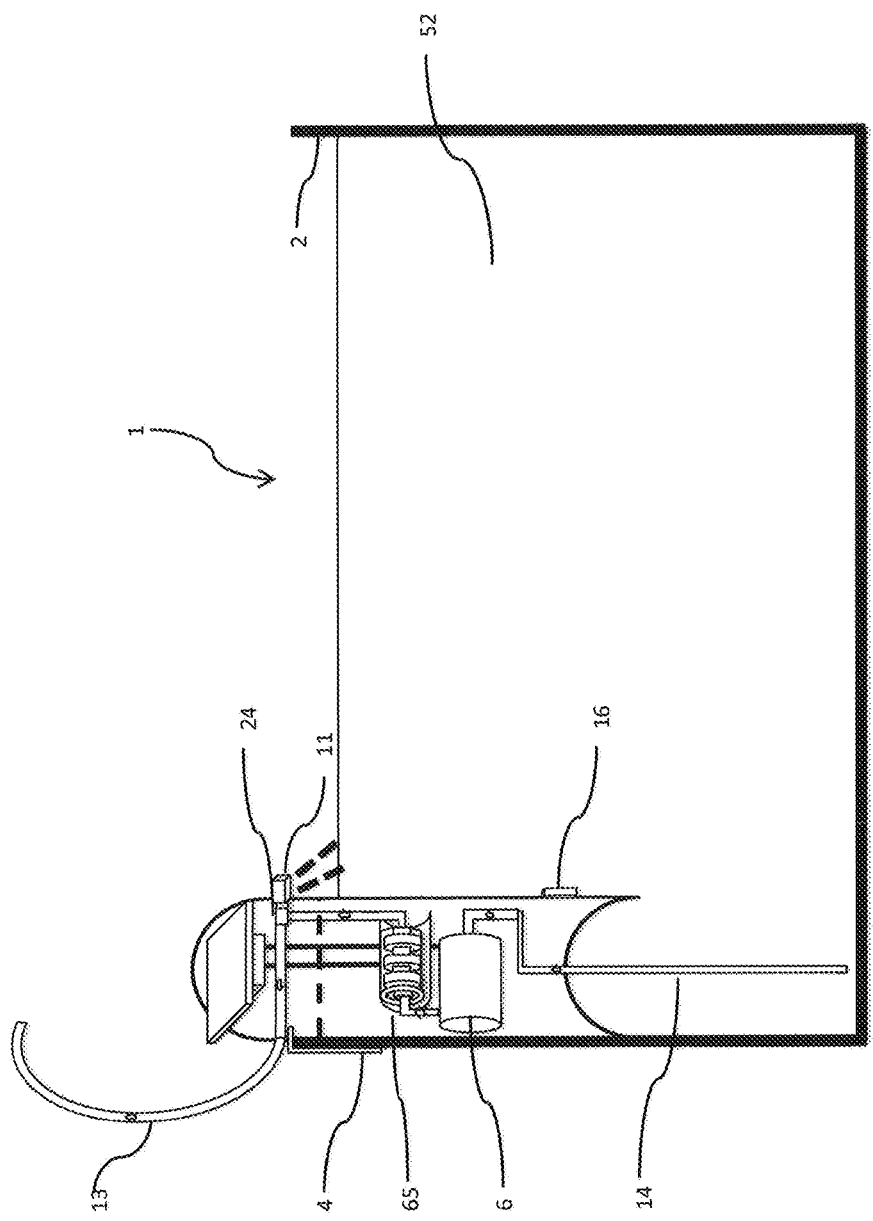

Referring to FIGS. 5 to 7, there is shown a mobile treatment system for conditioning of aquarium water, the system comprising a mobile or wheelable container 2, and a water treating apparatus 3 mounted on a portion of the container by brackets 4. The water treating apparatus 3 includes a water conditioning and/or flow through system 9, a submersible pump 6 mounted within housing 7, and an electronic control panel 60 for controlling parameters such as but not limited to water temperature, water flow rate and select passage for flow, and fill volume.

The water treating apparatus 3 includes a first inlet 10 of the submersible pump 6, which in a first operating condition draws water 52 from a lower portion of the mobile container 2 through conduit 14. As shown in this embodiment, the housing is submersed within the container up to a maximum water line 54.

A first outlet 55 of the submersible pump 6 is connected to a spray nozzle outlet 11 downstream therefrom defining a first passage for recirculating water drawn into the first inlet 10 back into the mobile container 2 after conditioning of the water. Pumps located above the water generally need to be primed—usually a button or plastic bulb pressed, drawing water up to the pump. Hence submersible pumps offer a useful alternative in aqueous environment.

A second outlet 57 of the water conditioning and/or flow through system 3 is provided in a second of a number of select operational modes, which defines a second passage in the water conditioning and/or flow through system to allow transfer of conditioned water from the container to the aquarium via second outlet 57 and conduit/hose 13.

In FIGS. 5 to 7, control of water flow through the inlets and outlets is managed by an electronic control panel which operates an electronic valve 24. The electronic controlled valve is operated to close/open a select passage in the flow through system 9 so that water flow can be controlled to recirculate and condition water, and replenish water volume in the aquarium.

The electronic control panel of the water treating apparatus 3 operates a water heating device 65 in a heating zone immediately upstream of the pump outlet 55. The heating device comprises a heating element 15a. The heating device is mounted within the housing 7 so that water passing through a first passageway passes through the heating zone for heating the water.

The heating device is linked to a first temperature sensor 16 mounted close to the pump inlet 10. As water from the container is drawn into pump inlet 10 through conduit 14, the water temperature is sensed by sensor 16.

If the sensed temperature is lower than the temperature selection, the heating element is activated and water 21 passing through first outlet 11 is heated and recirculated until temperature sensor 16 measures temperature at the selected temperature.

In one select operating condition, the water conditioning and/or flow through system 9 recirculates and conditions water from the container in a first pathway, and when a predetermined condition is obtained, the container is relocated close to an aquarium where a selection device on the water conditioning and/or flow through system directs conditioned water to a transfer line into the aquarium.

In other embodiments, hot water can be added to the water in the secondary container to quickly bring the temperature to that in the Aquarium. Given, the hot water is effectively untreated water, a water conditioning test should then be undertaken and the appropriate chemical additives introduced to the container. The recirculation process thoroughly mixes the chemicals.

In a further process of the present system, water in the secondary container is spray recirculated, which de-chlorinates and aerates the water. Given the time required to treat the water, the water can be heated at the same time with a thermostatically controlled submersible heating element 65 in the container.

The inclusion of the heating element within the present system is practical for both processes. The heating element effectively heats the water in the secondary container within minutes prior to the conditioned water being introduced to the Aquarium.

The effect on the water quality after passing through the heating element we believe is minimal because the water is passed through the heating element for a short time and not exposed to the water on a continual basis compared with conventional aquarium heaters. For example, a standard Aquarium heater is housed in glass to separate the water from the heating element.

In one embodiment (not shown) the water conditioning system can include an aquarium heater which is integral with or a component of the flow through system. Tests performed by the applicant indicate that water in the secondary container can be heated relatively quickly and efficiently with an aquarium heater because the secondary container contains a lower volume of water, and the flowthrough/recirculation system allows for the water to have greater exposure to the aquarium heater. A further advantage of this aspect is that the heater can be designed to automatically switch Off when removed from water.

Figure 8:
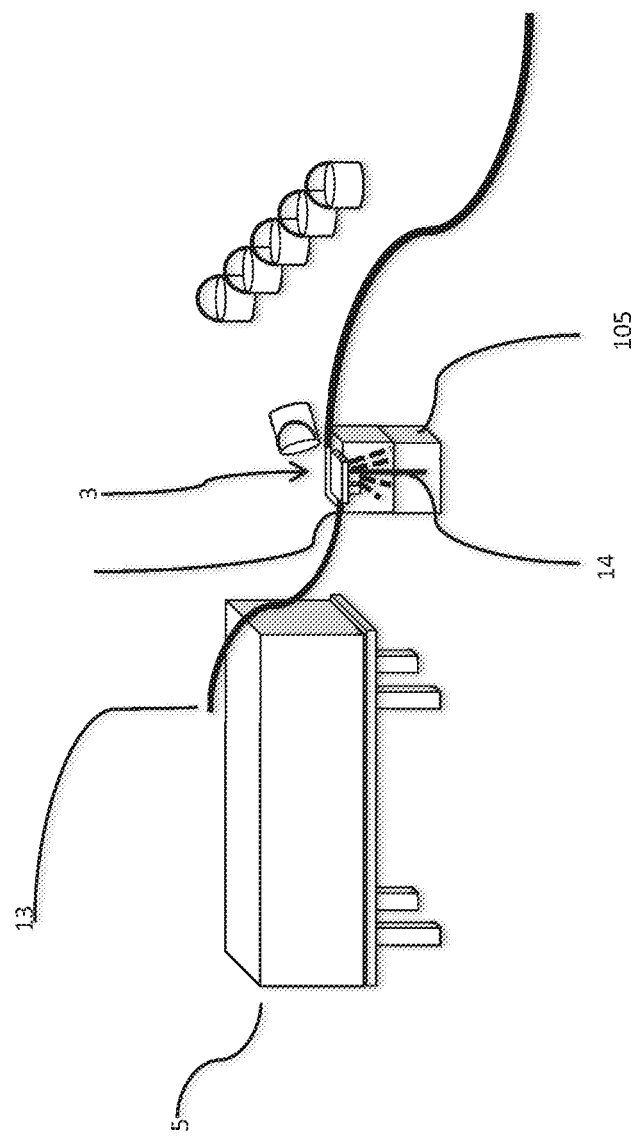
FIG. 8 is a schematic representation of a further embodiment of the invention of replenishing water of an aquarium.

Referring to FIG. 8, there is shown a further embodiment of the present invention in which a secondary container 105 is located close to the aquarium or primary container 5. In this embodiment the secondary container includes a water treating apparatus 3 comprising a water conditioning and/or flow through system and a pump mounted within a housing. In accordance with embodiments shown in FIGS. 1 to 7, the water treating apparatus 3 includes a first inlet 10 of the pump, which in a first operating condition draws water from a lower portion of the mobile container 2 through conduit 14. A first outlet (not shown) of the pump is connected to a spray nozzle outlet 11 defining a first passage for recirculating water drawn into the first inlet 10 back into the secondary container 105 after conditioning of the water. This select passage of spray recirculating of water in the secondary container helps to de-chlorinate and oxygenate the water.

The water treating apparatus 3 also includes a second outlet 12 of the water conditioning and/or flow through system. In a second of a number of select operational modes, the water treating apparatus 3 includes a second inlet 10a of the pump (see FIG. 2), which defines a second passage in the water conditioning and/or flow through system to allow transfer of conditioned water from the container to the aquarium via second outlet 12 and conduit/hose 13. In this embodiment the secondary container can be located close to the aquarium hence does not need to include wheels.

Figure 9:
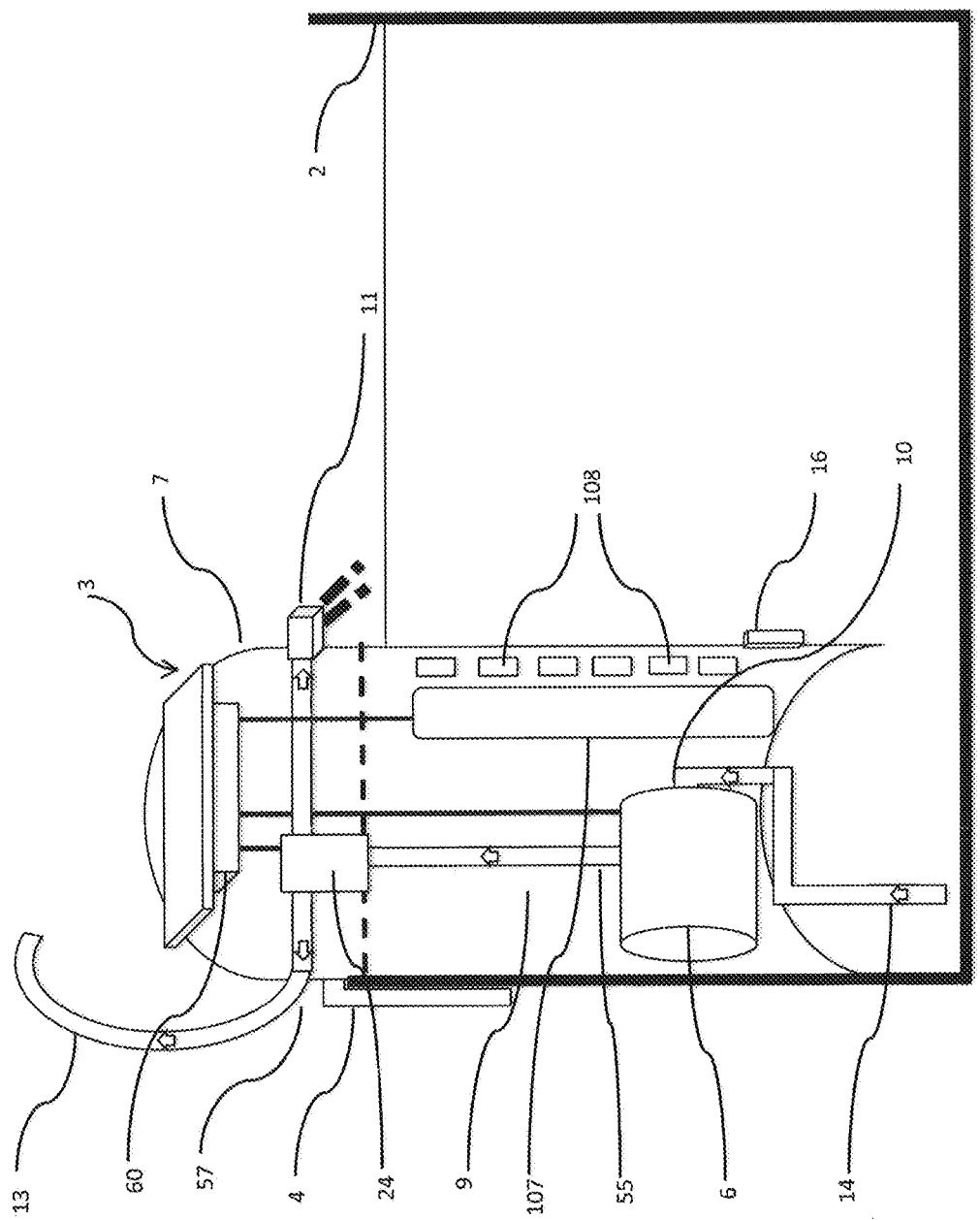
FIG. 9 is a schematic cut away representation of a water treating apparatus used in the mobile water transfer system in accordance with another preferred embodiment of the present invention.
Figure 10:
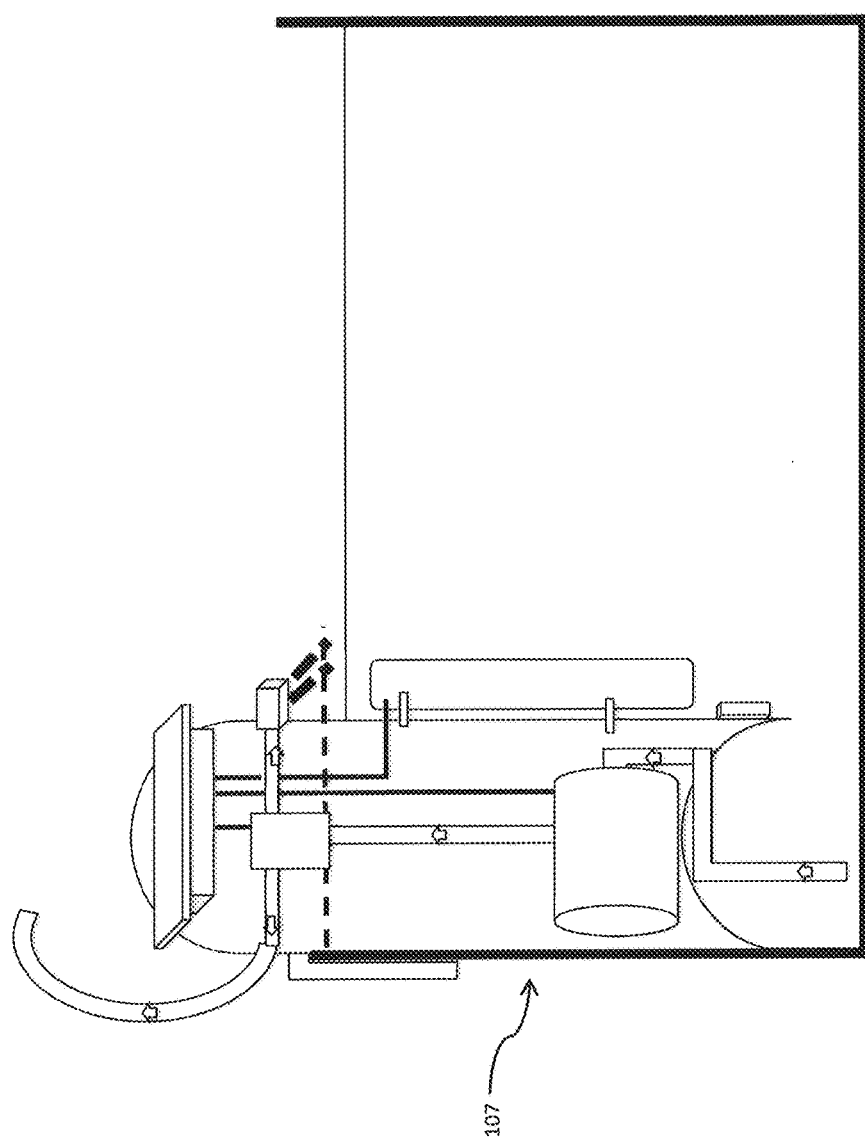
FIG. 10 is a schematic cut away representation of water treating apparatus used in the mobile water transfer system in accordance with another preferred embodiment of the present invention.

Control of water flow through the inlets and outlets is managed by a switching means. Referring to FIGS. 9 and 10, there is shown a mobile treatment system for conditioning of water in an aquarium, the system comprising a container 2, and a water treating apparatus 3 mounted on a portion of the container by brackets 4. The water treating apparatus 3 includes a water conditioning and/or flow through system 9, a submersible pump 6 mounted within housing 7, and an electronic control panel 60 for controlling parameters such as but not limited to water temperature, water flow rate and select passage for flow, and fill volume.

The water treating apparatus 3 includes a first inlet 10 of the submersible pump 6, which in a first operating condition draws water 52 from a lower portion of the container 2 through conduit 14. As shown in this embodiment, the housing is submersed within the container 2 up to a maximum water line (shown in dotted outline).

A first outlet 55 of the submersible pump 6 is connected to a spray nozzle outlet 11 downstream therefrom defining a first passage for recirculating water drawn into the first inlet 10 back into the mobile container 2 after conditioning of the water.

A second outlet 57 of the water conditioning and/or flow through system 9 is provided in a second of a number of select operational modes, which defines a second passage in the water conditioning and/or flow through system to allow transfer of conditioned water from the container to the aquarium via second outlet 57 and conduit/hose 13.

In FIGS. 9 and 10, control of water flow through the inlets and outlets is managed by an electronic control panel which operates an electronic valve 24. The electronic controlled valve is operated to close/open a select passage in the flow through system 9 so that water flow can be controlled to recirculate and condition water, and replenish water volume in the aquarium.

In FIGS. 9 and 10, an aquarium heater 107 is located within the housing 7 and operatively interconnected to the electronic control panel. The housing 7 in FIG. 9 also includes a series of openings forming vents 108 for flow through into the housing. In an On condition, the aquarium heater 107 heats water entering the vents 108. Heating of water causes convection currents such that water continues to circulate and exposes cooler water for heating.

The electronic control panel of the water treating apparatus 3 operates the aquarium heater in a heating zone immediately upstream of the pump outlet 55. The heating device is linked to a first temperature sensor 16 mounted close to the pump inlet 10. As water from the container is drawn into pump inlet 10 through conduit 14, the water temperature is sensed by sensor 16.

If the sensed temperature is lower than the temperature selection, the heating element is activated and water passing through first outlet 11 is heated and recirculated until temperature sensor 16 measures temperature at a selected temperature.

In FIG. 10, the aquarium heater is mounted on an external portion of the housing 7.

Figure 11:
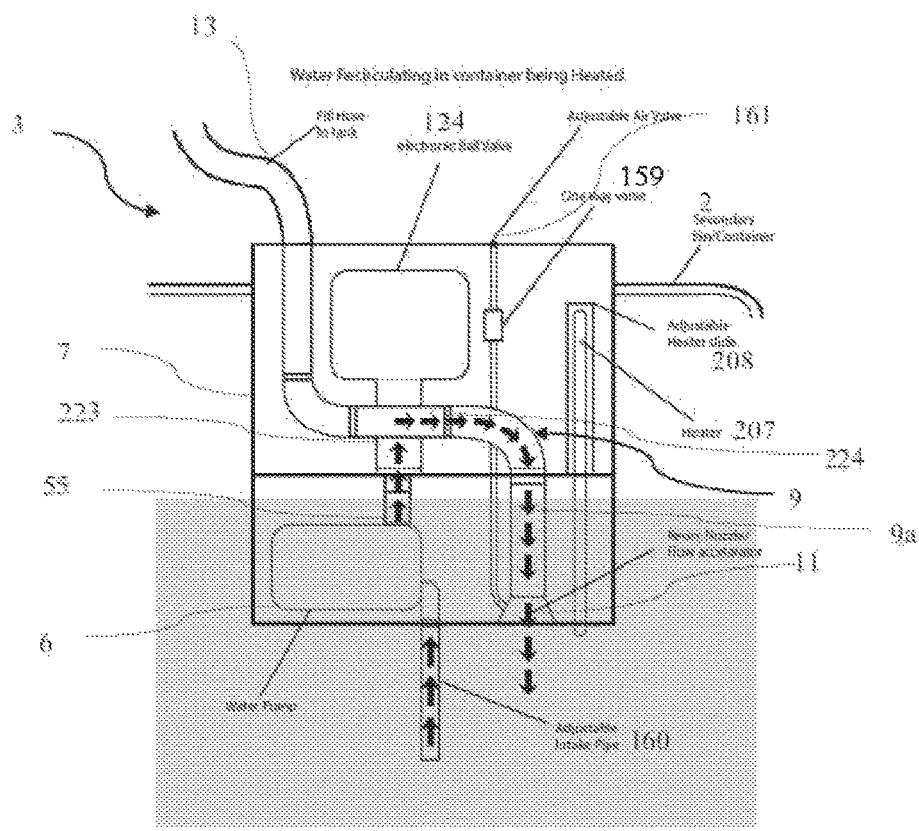
FIG. 11 is an internal schematic representation of a water treatment apparatus of the invention for conditioning and replenishing water of an aquarium showing flows in a secondary container showing flows in one condition.
Figure 12:
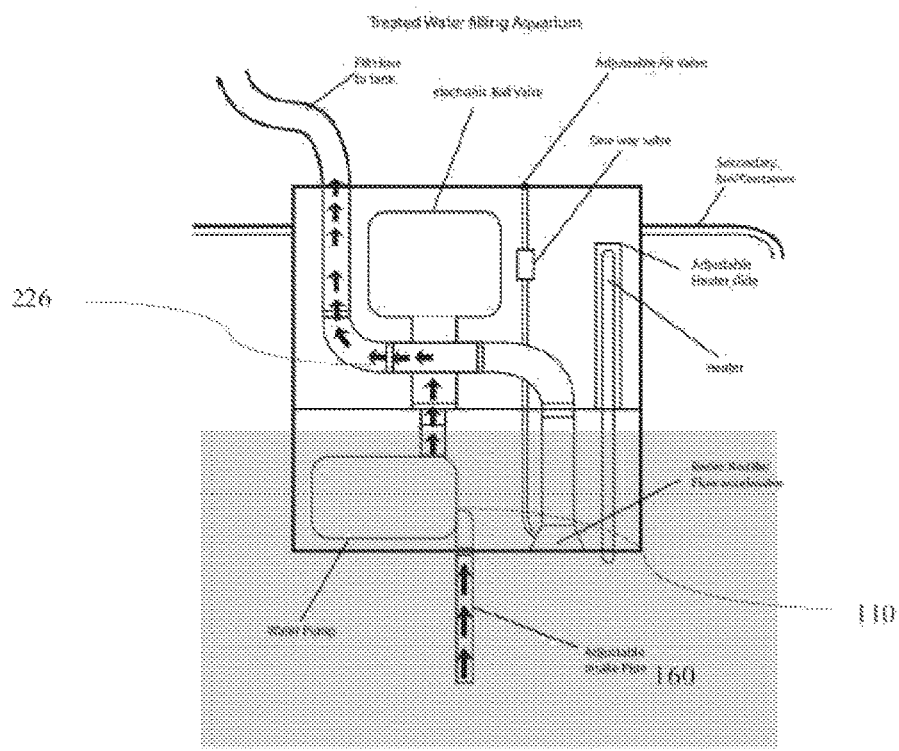
FIG. 12 is an internal schematic representation of a water treatment apparatus of the invention for conditioning and replenishing water of an aquarium showing flows in a secondary container showing flows in second condition.
Figure 16:
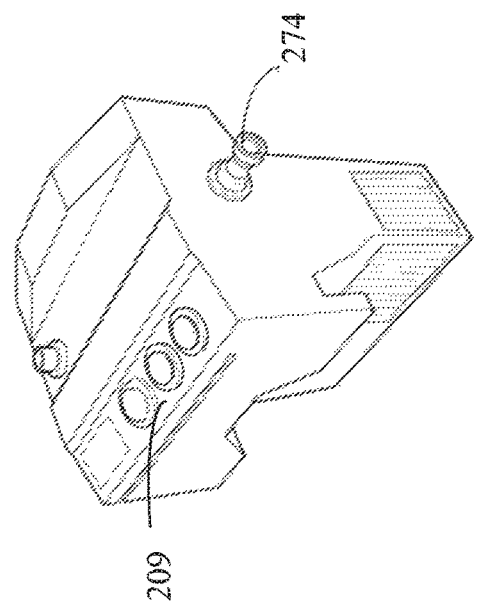
FIG. 16 is a schematic representation of a water treatment apparatus of the invention for conditioning and replenishing water of an aquarium in accordance with one embodiment of the invention.

Referring to FIGS. 11 and 12, there is shown a further alternative embodiment showing a water treatment apparatus 3 for use in the mobile treatment system of the present invention. The water treatment apparatus 3 contains a housing 7 mounted on the secondary container 2. Within the housing there is a water pump 6 having an adjustable intake pipe 160 forming a first inlet 110 receiving liquid from the secondary container, and a first outlet 55. The water treatment apparatus further comprises a water conditioning and/or flow through system 9 having a network of liquid transfer conduits and valve means forming multiple water flow pathways within the housing.

The first outlet 55 of the water treatment apparatus is interconnected by a conduit 9a to a recirculation nozzle 11, submerged in the water of the secondary container, forming a first flow pathway (see FIG. 11 indicated by direction of arrows) having a second inlet 223 and a second outlet 224, and a conduit 13 forming a second flow pathway (see FIG. 12 and direction of arrows) having a third outlet 226 for directing conditioned water to a separate aquarium downstream. A third flow through path (not shown) can comprise water transfer from the aquarium through hose 13 so the direction of water flow is into the water treatment apparatus through the first flow path exiting the recirculation nozzle.

Location of the recirculation nozzle as shown in a submerged condition provides a positive effect on circulating water through the secondary container. The recirculation nozzle 11 acts as a liquid flow accelerator, and is interconnected to a one way valve 159 that is in communication with an adjustable air valve 161, which allows ingress of air from the environment to effectively aerate the accelerated flow at the recirculation nozzle. The aeration at the nozzle assists to remove chlorine from the water. In one embodiment, additional conditioning chemicals can be added to the secondary container.

The water treatment apparatus 3 further contains an electronic ball valve 124 mounted in the housing, which is operable to open and close the at least first and second flow pathways, and a heater 207 having an adjustable heater slide 208. The slide heater in this embodiment is mounted within the housing 7 and adapted to be in contact with the water in the secondary container. Heating of the water in the secondary container provides an improved temperature matching for the conditioned water and aquarium. In this embodiment, there is no filter or filtration, and the water treatment device is mountable on a rim portion of the container.

Control of water flow through the inlets and outlets is managed by an electronic control panel 209 (see FIG. 13a) which operates the electronic ball valve 124 and thereby flow paths, and controls heating, pumping and recirculation. The electronic ball valve is operated by the control panel to close/open a select passage in the flow through system 9 so that water flow can be controlled to recirculate and condition water, and replenish water volume in the aquarium. As shown in FIG. 13b, from a side view, the water treatment apparatus has a u-shaped recess 212 which in an operating condition is seated on a rim portion of the secondary container.

As shown in FIG. 14 the secondary container 2 includes wheels 210 so that water can be conditioned in the secondary container at a position remote to the aquarium 5 and be transported after conditioning to be adjacent the aquarium. When the water is sufficiently conditioned to a predetermined aquarium condition(s), the pumping control on the control panel is actuated to open the second flow path and urge transfer of the conditioned water through the third outlet 226 of the water conditioning and/or flow through system to the aquarium. In this embodiment, conditioning, aerating and heating of the water is performed directly to the water in the secondary container.

Figure 15:
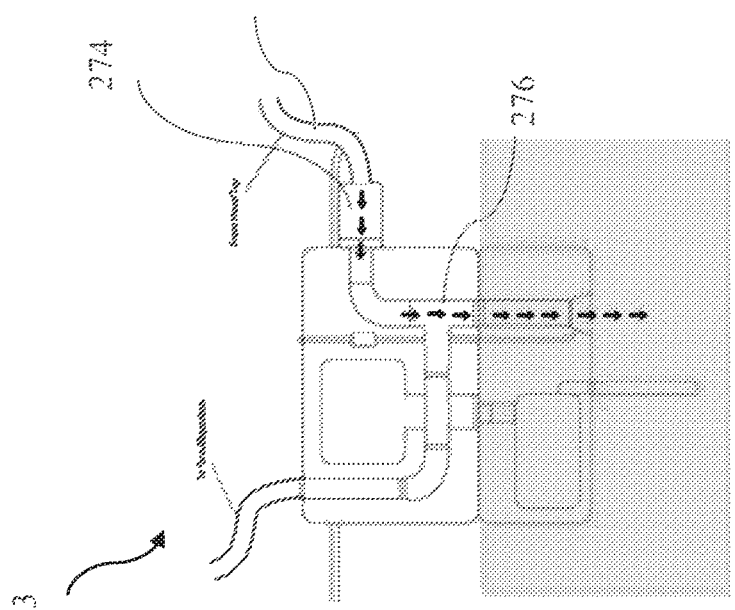
FIG. 15 is an internal schematic representation of a water treatment apparatus of the invention for conditioning and replenishing water of an aquarium showing flows in a secondary container showing flows in a third condition.

Referring to FIG. 15, there is a further alternative embodiment showing a water treatment apparatus 3 for use in the mobile treatment system of the present invention. The water treatment apparatus 3 includes a hose connector 274 located on a side portion of the apparatus connectable by a hose 275. The connector 274 allows for secure connection of the hose 275 to provide a third flow path from a domestic water supply to enable filling of the secondary container which can be located next to the aquarium or at another remote or separate location. Further, the apparatus 3 comprises a temperature sensor positioned within the circulating tube 276 to measure the temperature of water being introduced to the secondary container. This has the advantage of providing temperature information of the water being recirculated.

Benefits

- a water change treatment is undertaken only once;
- decreased labor required to transfer large volumes of water;
- decreased time taken for water change;
- mobile system so water conditioning can be undertaken remote from the aquarium;
- efficient and practical water conditioning and change where spillage can be controlled in wet areas;

water temperature can be adjusted to match aquarium temperature;

a user is more likely to maintain healthy water environment for fish and other aquatic animals—i.e., improves routine water change task;

improves health of fish overall and during water replacement;

reduces need for and costs associated with excessive chemical additives and fish health treatments;

can be used for domestic and larger aquariums;

system can be used to remove water from the aquarium, as well as replacing with conditioned water, The system of the invention provides an alternative cost effective way of conditioning water for an aquarium remote from an aquarium, and subsequent transfer of conditioned water from the container at the site of an aquarium.

The system significantly reduces labor and time, and does not form part of the aquarium display hence does not detract from the aesthetic appeal and reduces the likelihood of water spillage in dry areas.

substantial labor and time savings in changing water of an aquarium, and because the system is mobile, it allows filling of different sized containers in a wet area for conditioning, and ready transfer to the aquarium substantially minimising spillage and mess in dry areas.

The configuration of the apparatus makes it easy to transport and use on any volume of water.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

SCOPE OF INVENTION

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to mobile treatment systems for conditioning of aquarium water.

The claims defining the invention are as follows:

1. A water replenishment apparatus that prepares a volume of water from a domestic water supply for delivery to an aquarium, the apparatus comprising:
   a first domestic water inlet that is configured to receive domestic water from a domestic water supply and is configured to transfer the domestic water to a container separate from an aquarium, the first domestic water inlet comprising a water condition sensor that senses a condition of the domestic water flowing through the first domestic water inlet;
   a water re-circulator comprising:
      a re-circulating flow path that has a second inlet positioned to receive container water from within the container:
      an outlet that delivers the container water back to the container;
      a water pump that pumps the container water through the re-circulating flow path; and
      a conditioner that changes a condition of the container water flowing through the re-circulating flow path so as to provide conditioned water; and
   a water delivery system that is configured to extract the conditioned water from the container and is configured to pump the conditioned water extracted from the container into a transfer line for delivery into an aquarium.

2. The water replenishment apparatus of claim 1, wherein the water re-circulator comprises an air inlet positioned to aerate a flow of water through the water re-circulator.

3. The water replenishment apparatus of claim 1, wherein the water delivery system comprises an extraction pump that communicates with a third inlet, separate from the second inlet, to extract water from the container and to pump the extracted water out of the water replenishment apparatus via a second outlet to which a transfer line is connectable to receive the extracted water.

4. The water replenishment apparatus of claim 3, wherein a conduit is connected to the third inlet and is configured to draw water from a lower portion of the container.

5. The water replenishment apparatus of claim 1, wherein the water replenishment apparatus is mountable to a top or rim portion of the container.

6. The water replenishment apparatus of claim 5, comprising mounting brackets adapted for mounting the water replenishment apparatus to an upper portion of the container.

7. The water replenishment apparatus of claim 6, wherein the mounting brackets are adjustable to allow removable mounting to a rim portion of the container.

8. The water replenishment apparatus of claim 1, wherein the water condition sensor is a water temperature sensor.

9. The water replenishment apparatus of claim 8, comprising a digital temperature display electrically connected to the water condition sensor for displaying a temperature determined by the water condition sensor.

10. The water replenishment apparatus of claim 1, further comprising a heating device that is actuated to heat a volume of the container water when a predetermined temperature is higher than a temperature determined by the water condition sensor.

11. The water replenishment apparatus of claim 1, further comprising a controller that is operatively connected to the water pump and the water delivery system, and actuation of the water pump and the water delivery system is via the controller.

12. A water replenishment system that prepares a volume of water from a domestic water supply and delivers the volume of water to an aquarium, the system comprises:
   a container;
   a water replenishment apparatus comprising:
      a first domestic water inlet that is configured to receive domestic water from a domestic water supply and is configured to transfer the domestic water to the container separate from an aquarium, the first domestic water inlet comprising a water condition sensor that senses a condition of the domestic water flowing through the first domestic water inlet;
      a water re-circulator comprising:
         a re-circulating flow path that has a second inlet positioned to receive container water from within the container;
         an outlet that delivers the container water back to the container;
         a water pump that pumps the container water through the re-circulating flow path;
         a conditioner that changes a condition of the container water flowing through the re-circulating flow path so as to provide conditioned water; and
      a water delivery system that is configured to extract the conditioned water from the container and is configured to pump the conditioned water extracted from the container into a transfer line for delivery into an aquarium; and
   a transfer line that is configured to connect with the water delivery system for transferring some or all of the conditioned water into an aquarium.

13. The water replenishment system of claim 12, further comprising a domestic water supply line configured to connect with the first inlet and with the domestic water supply.

14. The system of claim 12, wherein the container is a mobile container.

15. A method of replenishing aquarium water comprising:
   providing a container able to receive a volume of water from a domestic water supply;
   fitting a water replenishment apparatus of claim 1 to the container, wherein the water replenishment apparatus comprises:
      a first domestic water inlet that is configured to receive domestic water from a domestic water supply and is configured to transfer the domestic water to the container separate from an aquarium, the first domestic water inlet comprising a water condition sensor that senses a condition of the domestic water flowing through the first domestic water inlet;
      a water re-circulator comprising:
         a re-circulating flow path that has a second inlet positioned to receive container water from within the container;
         an outlet that delivers the container water back to the container;
         a water pump that pumps the container water through the re-circulating flow path;
         a conditioner that changes a condition of the container water flowing through the re-circulating flow path so as to provide conditioned water; and
      a water delivery system that is configured to extract the conditioned water from the container and is configured to pump the conditioned water extracted from the container into a transfer line for delivery into an aquarium;

supplying a volume of water from the domestic water supply to the container via the first inlet; conditioning the volume of water by changing chemistry or temperature of the water;

re-circulating at least some of the volume of water through the water re-circulator; and when a condition of the volume of water is suitable for adding to an aquarium, replenishing water of the aquarium by delivering some or all of the volume of water from the container via the water delivery system.

16. The method of replenishing aquarium water according to claim 15, further comprising extracting water from the aquarium via the water delivery system by placing an inlet of the water delivery system in communication with the water of the aquarium and operating the water delivery system to extract water from the aquarium.

17. The method of replenishing aquarium water according to the method of claim 16, wherein the extracting water from the aquarium comprises fitting the water delivery system with a gravel vacuum and filter.

* * * * *